US011631305B2

(12) United States Patent
Derickson

(10) Patent No.: US 11,631,305 B2
(45) Date of Patent: Apr. 18, 2023

(54) CENTRALLY MANAGED EMERGENCY EGRESS GUIDANCE FOR BUILDING WITH DISTRIBUTED EGRESS ADVISEMENT DEVICES

(71) Applicant: LGHorizon, LLC, Denver, CO (US)

(72) Inventor: Russell G. Derickson, Broomfield, CO (US)

(73) Assignee: LGHORIZON, LLC, Denver, CO (US)

( * ) Notice: Subject to any disclaimer, the term of this patent is extended or adjusted under 35 U.S.C. 154(b) by 280 days.

(21) Appl. No.: 17/167,437

(22) Filed: Feb. 4, 2021

(65) Prior Publication Data
US 2021/0158668 A1    May 27, 2021

Related U.S. Application Data

(63) Continuation of application No. 17/090,088, filed on Nov. 5, 2020, now Pat. No. 11,335,171, which is a
(Continued)

(51) Int. Cl.
*G08B 7/06* (2006.01)
*G06Q 90/00* (2006.01)
*G08B 27/00* (2006.01)

(52) U.S. Cl.
CPC .......... *G08B 7/066* (2013.01); *G06Q 90/205* (2013.01); *G08B 7/062* (2013.01); *G08B 27/001* (2013.01)

(58) Field of Classification Search
CPC ...... G08B 7/066; G08B 7/062; G08B 27/001; G06Q 90/205; Y02A 10/40
See application file for complete search history.

(56) References Cited

U.S. PATENT DOCUMENTS

| 4,171,944 A | 10/1979 | Hirschmann |
| 5,032,989 A | 7/1991 | Tornetta |
(Continued)

FOREIGN PATENT DOCUMENTS

| WO | WO-2009038557 A1 * | 3/2009 | ............ G08B 7/066 |
| WO | WO 2010/054794 | 5/2010 | |
(Continued)

OTHER PUBLICATIONS

PCT International Preliminary Report on Patentability in International Appln. No. PCT/US2020/014971, dated Aug. 6, 2021, 10 pages.
(Continued)

*Primary Examiner* — Ryan W Sherwin
(74) *Attorney, Agent, or Firm* — Barnes & Thornburg LLP

(57) ABSTRACT

A system for centrally managing and executing emergency egress guidance. A first computing device can receive an indication of an emergency and user presence information in a building, retrieve, from a local data store, generated egress instructions for the building, select, for each of a plurality of egress advisement devices and based on the emergency indication, user presence information, and location of each egress advisement device, one of the egress instructions that is customized for each egress advisement device, and transmit, to each egress advisement device, the selected instructions to be outputted to guide users to exit the building. Each egress advisement device can determine that communications are terminated between the egress advisement devices and the computing device, obtain the emergency indication and user presence information, and retrieve, from the local data store, a second of the egress instructions associated with the location of the device.

20 Claims, 8 Drawing Sheets

US 11,631,305 B2

Page 2

Related U.S. Application Data continuation of application No. 16/780,056, filed on Feb. 3, 2020, now Pat. No. 10,872,510, which is a continuation of application No. 16/258,022, filed on Jan. 25, 2019, now Pat. No. 10,553,085.

(56) References Cited

U.S. PATENT DOCUMENTS

| | | |
|---|---|---|
| 5,568,825 A | 10/1996 | Faulk |
| 5,697,450 A | 12/1997 | Stehling et al. |
| 5,794,653 A | 8/1998 | DeSmet et al. |
| 5,881,115 A | 3/1999 | Lipner et al. |
| 6,006,016 A | 12/1999 | Faigon et al. |
| 6,029,751 A | 2/2000 | Ford et al. |
| 6,150,943 A * | 11/2000 | Lehman ............... G08B 7/062 340/332 |
| 6,195,002 B1 | 2/2001 | Evans, Jr. |
| 6,281,790 B1 | 8/2001 | Kimmel |
| 6,317,042 B1 | 11/2001 | Engelhom et al. |
| 6,505,145 B1 | 1/2003 | Bjornson |
| 6,648,077 B2 | 11/2003 | Hoffman |
| 6,691,064 B2 | 2/2004 | Vroman |
| 6,728,660 B2 | 4/2004 | Bjornson |
| 6,763,148 B1 | 7/2004 | Sternberg et al. |
| 6,947,797 B2 | 9/2005 | Dean et al. |
| 6,957,110 B2 | 10/2005 | Wewalaarachchi et al. |
| 7,032,435 B2 | 4/2006 | Hassenflug |
| 7,185,711 B2 | 3/2007 | Jackson |
| 7,209,817 B2 | 4/2007 | Abdel-Malek et al. |
| 7,271,704 B2 | 9/2007 | McSheffrey et al. |
| 7,340,649 B2 | 3/2008 | Angamuthu et al. |
| 7,541,938 B1 | 6/2009 | Engelhaupt |
| 7,579,945 B1 | 8/2009 | Richter et al. |
| 7,581,188 B2 | 8/2009 | Hiles |
| 7,818,265 B2 | 10/2010 | Loveland |
| 7,882,026 B1 | 2/2011 | Zettner |
| 7,882,028 B1 | 2/2011 | Devine et al. |
| 7,970,674 B2 | 6/2011 | Cheng et al. |
| 8,078,531 B2 | 12/2011 | Mcelroy et al. |
| 8,378,817 B2 | 2/2013 | Fox |
| 8,418,773 B2 | 4/2013 | Cerrano |
| 8,473,917 B2 | 6/2013 | Weatherhead |
| 8,567,757 B2 | 10/2013 | Pitchford et al. |
| 8,577,131 B1 | 11/2013 | Li et al. |
| 8,832,115 B2 | 9/2014 | Smintina |
| 8,973,670 B2 | 3/2015 | Enk |
| 9,202,362 B2 | 12/2015 | Hyland |
| 9,242,130 B2 | 1/2016 | Hennegan |
| 9,403,046 B2 | 8/2016 | Schmitt et al. |
| 9,536,231 B2 | 1/2017 | Lerick et al. |
| 9,665,798 B2 | 5/2017 | Watanabe et al. |
| 9,741,237 B1 * | 8/2017 | Knas ................. G01C 21/206 |
| 9,842,479 B1 * | 12/2017 | Black ................. G08B 25/10 |
| 9,940,663 B2 * | 4/2018 | Ward ................. G06Q 30/0639 |
| 10,026,278 B1 | 7/2018 | Asaro et al. |
| 10,145,699 B2 | 12/2018 | Spinelli et al. |
| 10,621,839 B2 * | 4/2020 | Vazirani ............. G08B 7/066 |
| 10,816,351 B1 | 10/2020 | Yao et al. |
| 11,335,171 B2 | 5/2022 | Derickson |
| 2002/0095269 A1 | 7/2002 | Natalini et al. |
| 2002/0116202 A1 | 8/2002 | Bantz et al. |
| 2002/0128728 A1 | 9/2002 | Murakami et al. |
| 2002/0130784 A1 | 9/2002 | Suzuki et al. |
| 2002/0166986 A1 | 11/2002 | Remby et al. |
| 2003/0038846 A1 | 2/2003 | Hori |
| 2003/0230415 A1 | 12/2003 | Wilson |
| 2004/0064477 A1 | 4/2004 | Swanger |
| 2004/0098279 A1 | 5/2004 | Frazier |
| 2004/0247177 A1 | 12/2004 | Rowe et al. |
| 2005/0108038 A1 * | 5/2005 | Cober ................. G06Q 90/205 705/324 |
| 2005/0128070 A1 * | 6/2005 | Faltesek ............. G08B 7/066 340/691.1 |
| 2005/0209770 A1 * | 9/2005 | O'Neill ............... G08B 27/001 701/411 |
| 2006/0044133 A1 | 3/2006 | Lou |
| 2006/0069578 A1 | 3/2006 | Borkowski et al. |
| 2006/0125632 A1 | 6/2006 | Luebke |
| 2006/0184383 A1 | 8/2006 | Davis et al. |
| 2006/0267788 A1 | 11/2006 | Delany |
| 2006/0272830 A1 | 12/2006 | Fima |
| 2006/0278410 A1 | 12/2006 | Reilly |
| 2007/0005159 A1 | 1/2007 | Borah |
| 2007/0008099 A1 | 1/2007 | Kimmel et al. |
| 2007/0033108 A1 | 2/2007 | Luhr |
| 2007/0053614 A1 | 3/2007 | Mori et al. |
| 2007/0067412 A1 | 3/2007 | Inui |
| 2008/0000649 A1 | 1/2008 | Guirguis |
| 2008/0059082 A1 | 3/2008 | Morrison |
| 2008/0114874 A1 | 5/2008 | Meir et al. |
| 2008/0183704 A1 | 7/2008 | Miller et al. |
| 2008/0215700 A1 | 9/2008 | Pillar |
| 2008/0255862 A1 | 10/2008 | Bailey |
| 2008/0314681 A1 * | 12/2008 | Patel ................. A62B 3/00 182/18 |
| 2009/0009353 A1 | 1/2009 | Schoettle |
| 2009/0045942 A1 * | 2/2009 | Schurter ............. A62C 99/00 340/539.11 |
| 2009/0089209 A1 | 4/2009 | Bixler et al. |
| 2009/0121860 A1 | 5/2009 | Kimmel |
| 2009/0219655 A1 | 9/2009 | Korolyov |
| 2009/0327024 A1 | 12/2009 | Nielsen et al. |
| 2010/0059236 A1 | 3/2010 | Yee |
| 2010/0070097 A1 | 3/2010 | Morgenstern |
| 2010/0274397 A1 | 10/2010 | Lozier |
| 2010/0312604 A1 | 12/2010 | Mitchell et al. |
| 2011/0035693 A1 | 2/2011 | Ueno |
| 2011/0136463 A1 | 6/2011 | Ebdon et al. |
| 2011/0157486 A1 | 6/2011 | Murata |
| 2011/0161239 A1 | 6/2011 | Muehlmeie et al. |
| 2011/0200461 A1 | 8/2011 | Christensen |
| 2011/0205053 A1 | 8/2011 | Chen et al. |
| 2011/0312354 A1 | 12/2011 | Nakamura |
| 2012/0047083 A1 | 2/2012 | Qiao et al. |
| 2012/0056711 A1 | 3/2012 | Hanrahan |
| 2012/0092183 A1 * | 4/2012 | Corbett ................. G08B 7/066 340/815.4 |
| 2012/0229283 A1 | 9/2012 | McKenna |
| 2012/0325502 A1 | 12/2012 | Hennegan |
| 2013/0063241 A1 | 3/2013 | Simon |
| 2013/0157610 A1 | 6/2013 | Vainik |
| 2013/0169430 A1 * | 7/2013 | Shook ................. G08B 17/10 340/539.1 |
| 2013/0170417 A1 | 7/2013 | Thomas et al. |
| 2013/0180139 A1 | 7/2013 | Underwood |
| 2013/0180737 A1 | 7/2013 | Tsuji |
| 2013/0201018 A1 | 8/2013 | Horstemeyer et al. |
| 2013/0218864 A1 | 8/2013 | Hong |
| 2013/0282280 A1 * | 10/2013 | Patterson ............. G08B 7/066 701/533 |
| 2013/0342361 A1 | 12/2013 | Greene |
| 2014/0114621 A1 | 4/2014 | Brigandi et al. |
| 2014/0244329 A1 | 8/2014 | Urban |
| 2014/0253326 A1 * | 9/2014 | Cho ................. H04W 4/90 340/539.11 |
| 2014/0253328 A1 * | 9/2014 | Craig ................. G08B 7/066 340/540 |
| 2014/0267776 A1 | 9/2014 | Duthu |
| 2014/0338927 A1 | 11/2014 | Palle |
| 2014/0340222 A1 * | 11/2014 | Thornton ............. G08B 7/066 340/539.17 |
| 2014/0340223 A1 | 11/2014 | Ilyin |
| 2014/0378159 A1 * | 12/2014 | Dolbakian .......... G06F 16/9537 455/456.1 |
| 2015/0070192 A1 | 3/2015 | Kates |
| 2015/0100618 A1 | 4/2015 | Le Guen et al. |
| 2015/0117701 A1 | 4/2015 | Ross et al. |
| 2015/0137967 A1 | 5/2015 | Wedig et al. |
| 2015/0165467 A1 | 6/2015 | Muff |
| 2015/0287295 A1 * | 10/2015 | Trivelpiece ........... H04W 88/16 340/6.1 |
| 2015/0287310 A1 * | 10/2015 | Deliuliis ............. H05K 999/99 340/628 |

(56) References Cited

U.S. PATENT DOCUMENTS

| | | | |
|---|---|---|---|
| 2015/0330796 A1 | 11/2015 | S R et al. | |
| 2015/0371518 A1 | 12/2015 | Mittal | |
| 2016/0049064 A1 | 2/2016 | McNabb et al. | |
| 2016/0117646 A1 | 4/2016 | Lerick | |
| 2016/0117785 A1 | 4/2016 | Lerick | |
| 2016/0121151 A1 | 5/2016 | Schmitt | |
| 2016/0180663 A1 | 6/2016 | McMahan et al. | |
| 2016/0247369 A1 | 8/2016 | Simmons | |
| 2016/0269882 A1 | 9/2016 | Balthasar et al. | |
| 2016/0303412 A1 | 10/2016 | Schmitt | |
| 2017/0053503 A1 | 2/2017 | Pal et al. | |
| 2017/0059197 A1* | 3/2017 | Goyal | G05D 23/1902 |
| 2017/0076409 A1 | 3/2017 | Lerick et al. | |
| 2017/0103633 A1* | 4/2017 | Khire | G08B 17/125 |
| 2017/0109981 A1 | 4/2017 | Joseph et al. | |
| 2017/0176190 A1 | 6/2017 | Harvey | |
| 2017/0234562 A1 | 8/2017 | Ribbich et al. | |
| 2017/0309142 A1 | 10/2017 | Phillips | |
| 2017/0325056 A1 | 11/2017 | Mehta et al. | |
| 2017/0358184 A1* | 12/2017 | Robinson | F21S 9/022 |
| 2018/0068077 A1* | 3/2018 | Schapiro | G08B 25/005 |
| 2018/0188034 A1 | 7/2018 | Duan | |
| 2018/0308326 A1* | 10/2018 | Miwa | G08B 7/066 |
| 2018/0356241 A1* | 12/2018 | Correnti | G08B 7/066 |
| 2019/0066464 A1* | 2/2019 | Wedig | G08B 27/001 |
| 2019/0086071 A1 | 3/2019 | O'Reilly et al. | |
| 2019/0104394 A1* | 4/2019 | Pfunder | G08B 27/00 |
| 2019/0172165 A1 | 6/2019 | Verteletskyi et al. | |
| 2019/0206233 A1* | 7/2019 | Huseth | H04W 4/90 |
| 2019/0217131 A1* | 7/2019 | Zechlin | G06V 20/20 |
| 2019/0362618 A1* | 11/2019 | Rao | G08B 25/003 |
| 2020/0020213 A1* | 1/2020 | Carr | G08B 7/06 |
| 2020/0027321 A1 | 1/2020 | Poirier et al. | |
| 2020/0175842 A1* | 6/2020 | Merjanian | G06F 3/011 |
| 2020/0242902 A1 | 7/2020 | Derickson | |
| 2020/0352008 A1* | 11/2020 | Chan | F21S 9/022 |
| 2021/0056820 A1 | 2/2021 | Derickson | |
| 2021/0166533 A1 | 6/2021 | Derickson | |
| 2021/0166534 A1 | 6/2021 | Derickson | |

FOREIGN PATENT DOCUMENTS

| | | | | |
|---|---|---|---|---|
| WO | WO 2011/130723 | | 10/2011 | |
| WO | WO-2012069782 A1 * | 5/2012 | | G08B 29/10 |
| WO | WO 2014051456 | | 4/2014 | |
| WO | WO-2018156404 A1 * | 8/2018 | | |
| WO | WO-2018227150 A1 * | 12/2018 | | G01C 21/206 |

OTHER PUBLICATIONS

Canadian Office Action in CA Appln. No 3127796, dated Oct. 19, 2021, 8 pages.

"Secure Online Scheduling for Appliance Repair & Maintenance," CenterPoint Energy, publically available before Oct. 28, 2015 [retrieved on Jan. 4, 2016], Retrieved from the Internet: URL<http://www.centerpointenergy.com/en-us/residential/services/home-service-plus/schedule-service>, 3 pages.

"Zestimate," Zillow.com, publically available before Oct. 28, 2015 [retrieved on Jan. 4, 2016], Retrieved from the Internet: URL<http://www.zillow.com/zestimate/>, 9 pages.

Actsoft, "Solutions for Today's Mobile Resources" Aug. 2012 available at http://www.actsoft.com/wp-content/Actsoft-Corporate-2012_v2. pdf uploads/2012/08/.

Artim, "An Introduction to Automatic Fire Sprinklers Part II," Waac Newsletter, vol. 17, No. 2. Retrieved from the Internet: <URL: http://cool.conservation-us.org/waac/wn/wn17/wn17-2/wn17-206.html>, 9 pages, May 1995.

Clicksoftware, "Field Service Management, Employee Location Tracking, Xora" 2016 available at http://smart.clicksoftware.com/products/overview/products-features/.

Cook, "Redfin buys Walk Score, marking first acquisition in company history," GeekWire, Oct. 22, 2014 [retrieved on Jan. 4, 2016], Retrieved from the Internet: URL<http://www.geekwire.com/2014/redfin-buys-walk-score-marking-first-acquisition-company-history/>, 9 pages.

Cook, "Redfin unveils new search feature: Find your dream home in the top school zone," GeekWire, Oct. 30, 2012 [retrieved on Jan. 4, 2016], Retrieved from the Internet: URL<http://www.geekwire.com/2012/redfin-rolls-out-new-school-zone-search-feature/>, 8 pages.

Cook, "Zillow makes real estate 'sexy,' revamps Zestimate algorithm," GeekWire, Jun. 14, 2011 [retrieved on Jan. 4, 2016], Retrieved from the Internet: URL<http://www.geekwire.com/2011/zillow-real-estate-sexy-revamps-zestimate-algorithm/>, 9 pages.

Duryee, "Amazon plans local services marketplace launch, challenging Yelp, Angie's List," GeekWire, Jun. 10, 2014 [retrieved on Jan. 4, 2016], Retrieved from the Internet: URL<http://www.geekwire.com/2014/amazon-plans-local-services-marketplace-launch-challenging-yelp-angies-list/>, 8 pages.

Esser by Honeywell, "ES Detect—TM, TME, TD, O, Otblue, O2T," 2 pages, 2014.

Esser by Honeywell, "Fire Alarm Systems," Product Catalog Jun. 2013, 364 pages, specifically p. 238.

FAA aircraft handbook, "Fire Protection Systems," Ch. 17, 22 pages, May 7, 2013.

Fenwal, "Continuous Fire and Overheat Detection Systems for Industry," 4 pages, Oct. 4, 2004.

GreCon, "Spark Detection and Extinguishment Systems Offer Safety for Your Production," Jan. 12, 2010, 16 pages.

Harper, "Best Real Estate Sites to Help With Your House Hunt," Techlicious, Jul. 24, 2013 [retrieved on Jan. 4, 2016], Retrieved from the Internet: URL<http://www.techlicious.com/guide/best-real-estate-sites-to-help-with-your-house-hunt/>, 4 pages.

Jarvis et al., "Outsourcing Your Errands: TaskRabbit Allows People to Rent Themselves Out for Odd Jobs," ABC News, Jun. 20, 2014 [retrieved on Jan. 4, 2016], Retrieved from the Internet: URL<http://abcnews.go.com/Business/outsourcing-errands-taskrabbit-people-rent-odd-jobs/story?id=24231980>, 5 pages.

Kakade and Wakdikar, "Fire Extinguisher Robot," International Journal of Innovative Research & Development, 3 pages, Jun. 2014.

Liu, "Building Tomography: Automatic Floor Plan Generation for Indoor Localization," A Thesis Submitted to The Hong Kong University of Science and Technology in Partial Fulfillment of the Requirements for the Degree of Doctor of Philosophy in Computer Science and Engineering, Hong Kong, Jul. 2013.

Mastin, "Scheduling Services Showdown: Schedulicity vs. Genbook vs. Appointy," PCWorld, publically available before Oct. 28, 2015 [retrieved on Jan. 4, 2016], Retrieved from the Internet: URL<http://www.pcworld.com/article/250227/scheduling_services_showdown.html>, 11 pages.

Mears, "The Best Online Tools for Your Housing Search," U.S. News: Money, Jan. 3, 2014 [retrieved on Jan. 4, 2016], Retrieved from the Internet: URL<http://money.usnews.com/money/personal-finance/articles/2014/01/03/the-best-online-tools-for-your-housing-search>, 6 pages.

Miles, "6 On-Demand Home Service Marketplaces," Street Fight Mag, Oct. 29, 2013 [retrieved on Jan. 4, 2016], Retrieved from the Internet: URL<http://streetfightmag.com/2013/10/29/6-on-demand-home-service-marketplaces/>, 7 pages.

Newton, "TaskRabbit is blowing up its business model and becoming the Uber for everything," The Verge, Jun. 17, 2014 [retrieved on Jan. 4, 2016], Retrieved from the Internet: URL<http://www.theverge.com/2014/6/17/5816254/taskrabbit-blows-up-its-auction-house-to-offer-services-on-demand>, 5 pages.

PCT International Search Report and Written Opinion in International Application No. PCT/US2020/014971 dated May 12, 2020, 16 pages.

PRNewswire, "Zillow Launches Zestimate Forecast Predicting Future Value of Homes," PRNewswire, May 8, 2014 [retrieved on Jan. 4, 2016], Retrieved from the Internet: URL<http://www.prnewswire.com/news-releases/zillow-launches-zestimate-forecast-predicting-future-value-of-homes-258520771.html>, 2 pages.

Slaton and Xiang, "Fire Away! A Smart, Servo-Controlled Fire Extinguisher," Retrieved from the Internet: <URL: http://people.ece.cornell.edu/land/courses/ece4760/FinalProjects/f2013/tms245_dzx3/tms245_dzx3/>, 18 pages, copyright 2013.

(56) References Cited

OTHER PUBLICATIONS

Tam, "Order a plumber like you would an Uber car with ClubLocal," CNET, Jun. 6, 2013 [retrieved on Jan. 4, 2016], Retrieved from the Internet: URL<http://www.cnet.com/news/order-a-plumber-like-you-would-an-uber-car-with-clublocal/>, 3 pages.

Tedeschi, "For Home Buyers, an App to Assess a House's Attributes," NY Times, Apr. 4, 2012 [retrieved on Jan. 4, 2016], Retrieved from the Internet: URL<http://www.nytimes.com/2012/04/05/technology/personaltech/for-home-buyers-an-app-to-assess-a-homes-attributes-app-smart.html? i=l>, 4 pages.

Thompson, "Understanding Zestimates and Making Them Work for You," RISMedia, publically available before Oct. 28, 2015 [retrieved on Jan. 4, 2016], Retrieved from the Internet: URL<http://rismedia.com/2014-03-02/understanding-zestimates-and-making-them-work-for-you/>, 3 pages.

White, "Angie's List app makes finding service a snap," Angie's List, Mar. 10, 2014 [retrieved on Jan. 4, 2016], Retrieved from the Internet: URL<http://www.angieslist.com/articles/angie-s-list-app-makes-finding-service-snap.htm>, 5 pages.

\* cited by examiner

CENTRALLY MANAGED EMERGENCY EGRESS GUIDANCE FOR BUILDING WITH DISTRIBUTED EGRESS ADVISEMENT DEVICES

CROSS-REFERENCE TO RELATED APPLICATIONS

This application is a continuation of U.S. application Ser. No. 17/090,088, filed on Nov. 5, 2020, which is a continuation of U.S. application Ser. No. 16/780,056, filed on Feb. 3, 2020, now U.S. Pat. No. 10,872,510, issued on Dec. 22, 2020, which is a continuation of U.S. application Ser. No. 16/258,022, filed on Jan. 25, 2019, now U.S. Pat. No. 10,553,085, issued on Feb. 4, 2020. The disclosure of the prior application is considered part of the disclosure of this application, and is incorporated in its entirety into this application.

TECHNICAL FIELD

This document generally describes technology for automatically determining a floor map of a building and using the floor map for advising how to exit the building during an emergency.

BACKGROUND

Fire districts strongly urge home residents to create a home fire escape plan, in written document form, that includes a map of a house layout, immediate exterior grounds, and details on windows and doors. Plan recommendation includes taking stock of each member of the household and identifying two pathways (e.g., doors, windows) for escape from each room in the house. Fire districts recommend that families become familiar with their escape plan and to rehearse the escape plan at least twice a year. However, many families fail to create an escape plan, let alone practice the escape plan regularly.

SUMMARY

A system for centrally managing and executing emergency egress guidance. A first computing device can receive an indication of an emergency and user presence information in a building, retrieve, from a local data store, generated egress instructions for the building, select, for each of a plurality of egress advisement devices and based on the emergency indication, user presence information, and location of each egress advisement device, one of the egress instructions that is customized for each egress advisement device, and transmit, to each egress advisement device, the selected instructions to be outputted to guide users to exit the building. Each egress advisement device can determine that communications are terminated between the egress advisement devices and the computing device, obtain the emergency indication and user presence information, and retrieve, from the local data store, a second of the egress instructions associated with the location of the device.

A system for emergency egress advisement from a building. An egress advisement device can receive a floormap and subset of emergency egress instructions associated with routes within the building, wherein the subset of instructions are associated with a location of the egress advisement device and are used, by the device, to direct users in proximity to the location of the device to egress from that location during an emergency, locally store the floormap and subset of instructions, receive a signal indicative of an emergency, locally select, based on real-time conditions in the building relative to the location of the egress advisement device, one of the subset of instructions, which is customized for users in proximity to the location of the egress advisement device, and output the selected instructions to guide the users in proximity to the location of the egress advisement device to egress from the building.

This document generally describes technology for automatically determining a floor map of a building and using the floor map for advising how to exit the building during an emergency. A monitoring system can automatically create an escape plan, based on pre-disaster and in-disaster motion detection of users within the home, and provide dynamic advisement to guide users out of the home during an emergency. The monitoring system can identify and guide users to essential egress routes, which can be critical if occupants have not created or rehearsed an escape plan. For example, during a fire, strategically placed voice guidance prompts can instruct residents in each room of a home regarding effective egress paths, based on previously automatically identified floor maps and current fire location information. Although fire detection and evacuation are described, the monitoring system can be used to detect and advise for other types of emergencies, such as gas leakage, water leaks, thieves trying to enter a home, and carbon dioxide detection, to name a few examples.

In one implementation, a system includes a central monitoring system for monitoring a building, user detectors, fire detectors, and signaling devices. The user detectors are configured to detect the presence of users within the building. The fire detectors are configured to detect locations of fires within the building. The signaling devices are configured to emit signals to indicate an exit route for exiting the building. The central monitoring system is configured to receive user presence information from the user detectors, and use the user presence information to determine a floormap of the building. The floormap indicates routes within the building, including exits out of the building. The system is further configured to receive fire indication information from the fire detectors located within the building. The fire indication information indicating one or more locations within the building that may have a fire. The system may determine, based on the floormap and the fire indication information, one or more exit routes that can be used by users to exit the building. The exit routes are to avoid the locations within the building that may have the fire. The system may send signaling instructions to the signaling devices for the signaling devices to emit a signal to indicate to the user an exit route to exit the building.

Such a system can optionally include one or more of the following features. Each given user detector may be configured to detect motion of users in proximity to the given user detector. The emitted signals may include voice commands. The emitted signals may include light signals. The light signals may include directional signals that direct users to an exit route. The fire indication information may include temperature readings. The fire indication information may include a rate of change of temperature readings.

In one implementation, a computer-implemented method includes receiving user presence information from user detectors; determining a floormap of the building based on the user presence information, the floormap indicating routes within the building, the routes including exits out of the building; receiving fire indication information from fire detectors located within the building, the fire indication information indicating one or more locations within the building that may have a fire; determining, based on the floormap and the fire indication information, one or more exit routes that can be used by users to exit the building, the exit routes avoiding the locations within the building that may have the fire; and send signaling instructions to signaling devices for the signaling devices to emit a signal to indicate to the user at least one of the exit routes to exit the building.

Such a method can optionally include one or more of the following features. Each given user detector may be configured to detect motion of users in proximity to the given user detector. The emitted signals may include voice commands. The emitted signals may include light signals. The light signals may include directional signals that direct users to an exit route. The fire indication information may include temperature readings. The fire indication information may include a rate of change of temperature readings.

Other embodiments of these aspects include corresponding apparatus and computer programs recorded on one or more computer storage devices, configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more implementations are depicted in the associated drawings and the description thereof below. Certain implementations may provide one or more advantages. For example, an emergency plan can be generated, and used in an emergency, even if residents have not previously generated an emergency plan. Dynamic evacuation guidance can be provided that is based on real-time situational information about occupants and compromised location(s) within a building. Real time information about a current incident can be exchanged between a monitoring system and emergency personnel systems. A monitoring system can evaluate possible evacuation routes, determined from automatically generated floor maps, to select recommended evacuation route(s), and instruct signaling devices to inform users of the recommended evacuation route(s).

Other features, objects, and advantages of the technology described in this document will be apparent from the description and the drawings, and from the claims.

BRIEF DESCRIPTION OF THE DRAWINGS

Like reference symbols in the various drawings indicate like elements.

DETAILED DESCRIPTION

Figure 1:
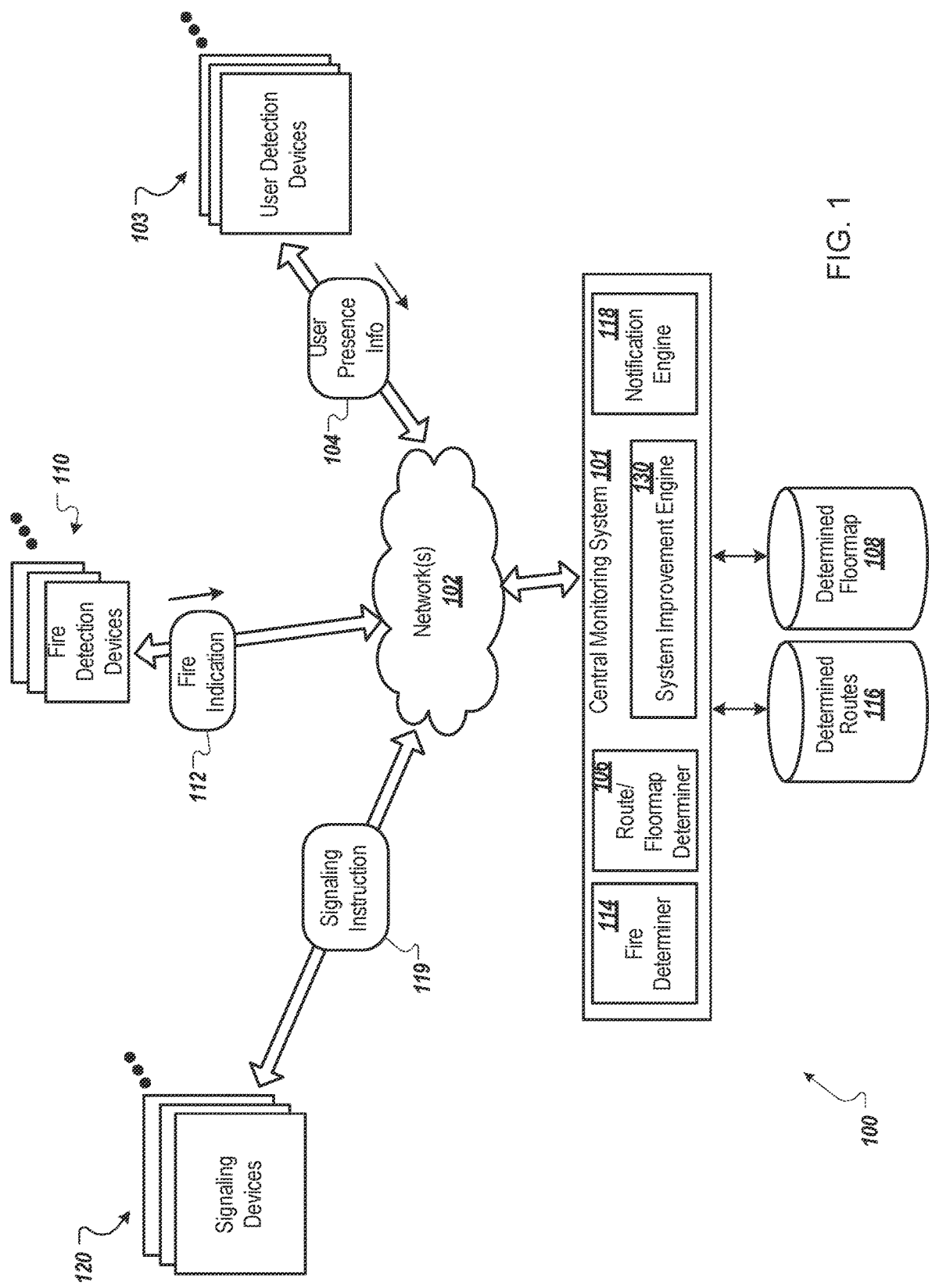
FIG. 1 is a conceptual diagram of an example system for automatically determining a floor map of a building and using the floor map for advising how to exit the building during an emergency.

FIG. 1 is a conceptual diagram of an example system 100 for automatically determining a floor map of a building and using the floor map for advising how to exit the building during an emergency. The system 100 includes a central monitoring system 101 for monitoring a building (e.g., a home). The central monitoring system 101 can communicate with various devices within the home using one or more wired and/or wireless networks 102. For example, the system 100 includes a set of user detection devices 103 that can detect a presence and movement of users within the building, at particular locations within the building. The user detection devices 103 can provide user presence information 104 to the central monitoring system 101. The user detection devices 103 can be of various configurations, such as motion sensors, cameras, door sensors, window sensors, door locks and window locks, other security devices, etc.

A route/floormap determiner 106 included in the central monitoring system 101 can use the user presence information 104 to determine and store a floormap 108 of the building. The floormap 108 indicates routes within the building, including exits out of the building.

The system 100 includes fire detection devices 110 for detecting locations of fires within the building. The fire detection devices 110 can be of various configurations, such as a smoke detector and a heat sensor (e.g., a temperature sensor, an infrared sensor, etc.).

The central monitoring system 101 can receive fire indication information 112 from the fire detection devices 110 that may indicate one or more locations within the building that may have a fire. A fire determiner 114 in the central monitoring system 101 can determine whether the fire indication information 112 indicates the presence of a fire. The fire indication information 112 can be temperature readings for example, as described in more detail below.

The route/floormap determiner 106 can determine, in response to the fire determiner 114 determining a presence of a fire, one or more exit routes 116 that can be used by users to exit the building, based on the floormap 108 and the fire indication information 112. The determined exit routes 116 can be selected so at to avoid the locations within the building that may have a fire (e.g., the fire indication information 112 can indicate location(s) of single or multiple fires within the building).

A notification engine 118 can generate and send signaling instructions 119 to signaling devices 120 located in the building, for the signaling devices 120 to emit signal(s) to indicate to users the determined routes 116 out of the building. The emitted signals can be voice commands, lighted signals, or other signals, as described in more detail below.

The central monitoring system 101 can further include a system improvement engine 130. The improvement engine 130 can employ machine learning to improve various functions of the central monitoring system 101, such as functions performed by the route/floormap determiner 106, the fire determiner 114, and the notification engine 118. In some embodiments, the improvement engine 130 is configured one or more engines that are separate from the other modules or engines (e.g., the route/floormap determiner 106, the fire determiner 114, and the notification engine 118) in the central monitoring system 101. Alternatively, the modules or engines of the central monitoring system 101 (e.g., the route/floormap determiner 106, the fire determiner 114, and the notification engine 118) are configured to operate functions of the improvement engine 130.

In some examples, the improvement engine 130 is configured to process an input, such as the user presence information 104, and generate a floormap 108 based on the input. In addition or alternatively, the improvement engine 130 is configured to process an input, such as the floormap 108 and the fire indication information 112, and generate, based on the input, one or more exit routes 116 which are used to evacuate users in the building.

In some examples, the improvement engine 130 can be trained to generate and update the floormap 108 adapted to changing aspects of occupancy by residents as well as visitors of a building. Further, the improvement engine 130 can be trained to predict presence and whereabouts of users in a building in response to determination of presence of a fire and generate at least one exit route 116. An example method for training the improvement engine 130 is illustrated and described with reference to FIG. 8.

The improvement engine 130 operates to bolster functioning and effectiveness of the central monitoring system 101 by adjusting the system 101 for changing circumstances in occupant status or occasions with guests. As such, an egress plan for a building can be modified rapidly with changing occupant circumstances including guest visitation. Such a plan can be stored locally in the system and in a cloud for redundancy. In certain examples, biometric sensing devices are also employed in implementing the improvement engine 130 and/or other operations of the system 101.

In addition to real time exit route guidance, a general home escape plan can be automatically created, based on automatically-determined floor maps, and made available for users, to view and rehearse, before emergencies happen. Generated plans can be stored both locally in the central monitoring system 101 of the house, as well as in the cloud for failsafe redundancy. Generated plans can be viewed and maintained by residents. For example, residents can update a plan, such as when changes in occupancy occur over time, or when changes in family membership occur (e.g., newborns, grown children leaving the household, deaths, and so forth), and occasions with babysitters or house guests in the home.

The system 100 can include features for assisting disabled users. For example, a deaf user could wear or carry a device (e.g., a wearable device or a hand-held device) that uses vibrational signals to guide the user on identified exit routes. As another example, a blind user could wear or carry a device that provides continuous audible verbal messages for egress guidance (e.g., to supplement other fixed audio devices or act as a substitute if fixed audio devices are not functioning).

The system 100 can include other features. For example, some or all devices included in the system 100 can include battery backup (e.g., lithium) for use in case of a power outage affecting some parts or all of a building. The system 100 can employ various hardware and software security measures, to prevent local or remote hacking. Security measures can prevent unauthorized users (e.g., would-be thieves) from obtaining information about a building floor plan, for example. Other features are described in more detail below.

In some embodiments, the system 100 can be used as a stand-alone system for a fire egress and guidance system. Other configurations for the system 100 are also possible.

Figure 2:
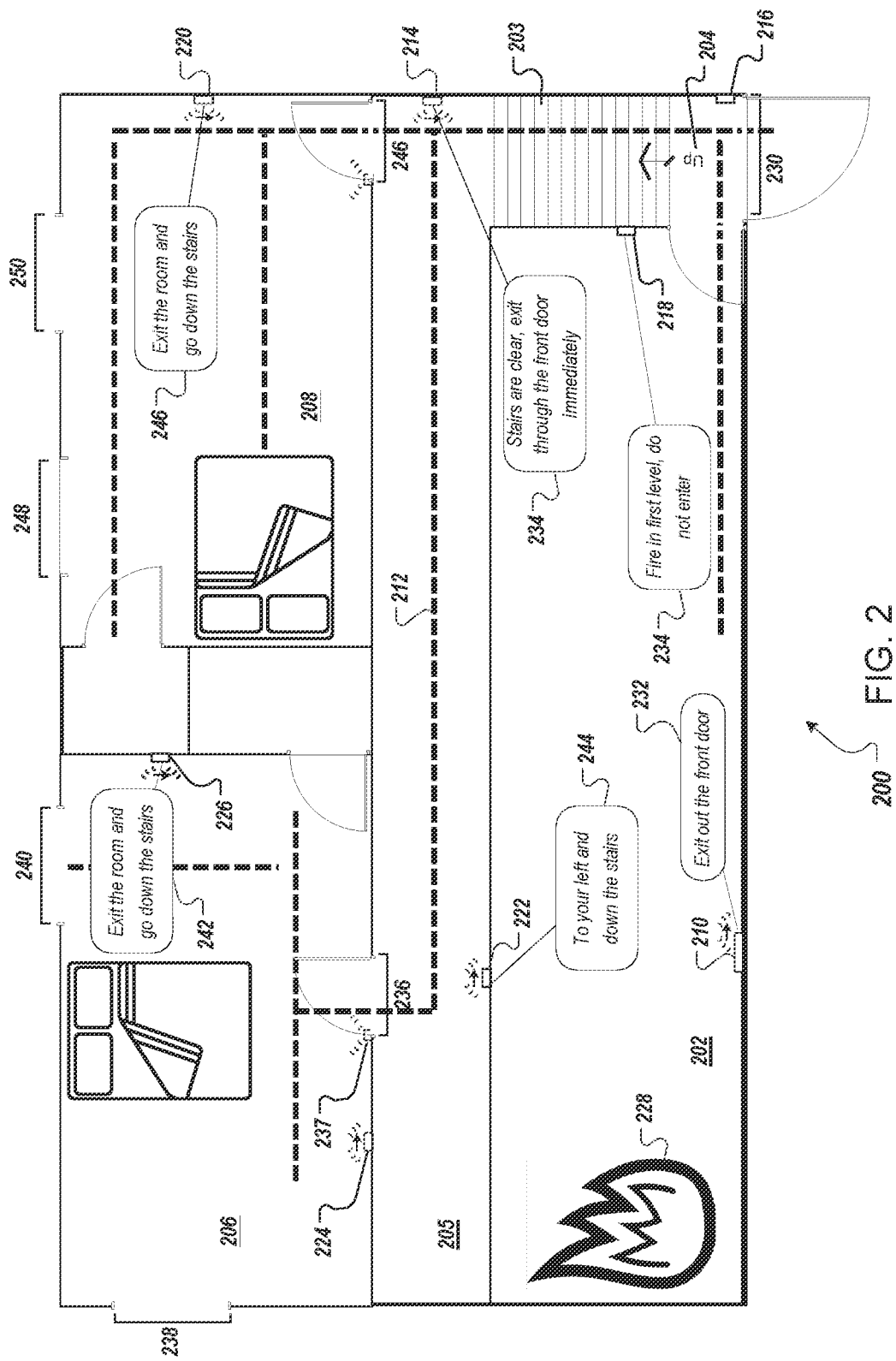
FIG. 2 is a conceptual diagram of an example building for which a floor map is automatically determined and used during an emergency.

FIG. 2 is a drawing of a house 200 that includes a lower level 202 and a stairway 203 that goes to an upper level (as indicated by a direction indication 204). The upper level includes a hallway 205, a first bedroom 206, and a second bedroom 208. A central monitoring system 210 has determined a floor map 212 that maps pathways within the house 200. The floor map 212 may have been determined from motion detection information obtained by detecting motion of occupants as they moved throughout the house 200. One or more devices in each room may include a motion detector, for example. For instance, some or all of devices 214, 216, 218, 220, 222, 224, and 226 may include motion detectors and are connected to the central monitoring system 210, through one or more wired or wireless connections.

In addition to motion detectors, the house 200 may include various smart thermostat devices throughout the house 200 that can detect a presence of a fire and communicate other information to the central monitoring system 210, for example. In some implementations, the devices 214, 216, 218, 220, 222, 224, and 226 include both a motion detector and a smart thermostat. In other implementations, other smart thermostat devices that do not include motion detectors are included in the house 200.

In general, devices that communicate with the central monitoring system 210 can include one or more of a smart thermostat, smoke detector, smart outlet covers, and signaling devices located, e.g., on doors and windows. A given device may provide one function or multiple functions (e.g., a smart outlet cover may include a motion detector and one or more signaling devices).

Although one central monitoring system 210 is shown, multiple monitoring devices may be included in the home 200, such as one monitoring device per room. A smart thermostat or a smoke detector can be a secondary monitoring device, for example. A secondary monitoring system (and the central monitoring system 210) can include various sensors (e.g., for fire, smoke, and motion detection) and/or can communicate with other sensors included in an area monitored by the respective monitoring device.

In some implementations, the central monitoring system 210 is a master monitoring system and other monitoring devices are secondary monitoring systems. In some implementations, each secondary monitoring system can take over control as a new master monitoring system if the central monitoring system 210 is out of commission (e.g., consumed by fire). A new master monitoring system can operate using last-received information from the central monitoring system 210 and information received from other secondary monitoring systems. In some implementations, all monitoring systems located in the house 200 can act as peer devices (e.g., pre-disaster and/or during a disaster), with no device designated as a master monitoring device.

As mentioned, devices included in the house 200 can connect to the central monitoring system 210 using one or more wired or wireless connections. Additionally or alternatively, devices in the house 200 can connect to a cloud based service, to upload information and download information provided by other devices, so that a given device can send and receive data even if in an home network is compromised, e.g., by fire. For example, during a disaster, devices may not be able to communicate on a local network, but a smart thermostat in one room and the central monitoring system 210 may each be able to communicate with the cloud service (e.g., using a cellular network) and thereby exchange information with each other, using the cloud service as an intermediary.

Various devices, e.g., secondary monitoring systems or other devices that include motion detection, such as the devices 214, 216, 218, 220, 222, 224, and 226, can provide motion detection information to the central monitoring system 210 and/or to secondary monitoring system(s). Each motion detection device can have a known location within the house 200, and can provide a device identifier along with provided motion detection information. The central monitoring system 210 can use the received motion detection information to determine the floor map 212 of the house 200. The floor map 212 indicates paths into and out of the house 200, and paths into and out of respective rooms or on the stairway 203. The motion detection information can indicate the paths that users frequently use while moving within the house 200. Paths can be identified by time and location of detected motion, as well as direction of motion as indicated by successive motion detection data points. For example, first, second and third motion sensors may detect motion at first, second, and third time points that are one second apart, indicating that a user moved between locations associated with the first, second, and third motion sensors. Frequency of movement, over time, can indicate main paths throughout the house 200. For example, motion detectors may detect occasional movement of a user in a corner of a room (e.g., by a dresser), but may more often detect movement of users in hallways, through doorways, on stairs, etc. The central monitoring system 210 may know which sensors are in proximity to doors (e.g., room doors, exit doors) and windows, and can identify paths that lead into and out of rooms and out of the house 200.

Sensors can be located on doors or windows. The central monitoring system 210 can determine an exit path by detecting movement of user towards a door and then the opening of that door. As a similar example, the central monitoring system 210 can detect a path that includes an exit by detecting the opening of a door when a user enters, and then detecting continuous movement of a user through the house 200 to a location within the house. The central monitoring system 210 can identify path segments within the house 200 that interconnect and that lead to an exit (e.g., door, window).

The central monitoring system 210 (or a secondary monitoring system) can receive information that indicates a presence of a fire within the house 200. For example, the central monitoring system 210 can receive (or can generate) information that indicates the presence of a fire 228 within the lower level 202 of the house 200. The presence of the fire 228 can be determined, for example, based on one or more received temperature readings being more than a threshold temperature. As another example, the central monitoring system 210 can receive a fire indication signal from one or more smoke detection devices. Other fire detection approaches can include IR (Infra-Red) fire detection and rate of rise temperature detection. Fire indication information can indicate which location(s) in the house 200 are on fire (or sufficiently close to a fire so as to be avoided by occupants of the house 200).

The central monitoring system 210 can determine, based on the floor map 212 and the received fire indication information, one or more exit routes that can be used by users to exit the house 200. The exit routes can include portions of the floor map 212 that avoid the locations within the house 200 that have been identified as locations to be avoided. For example, based on the location of the fire 228 being on the left side of the house 200, the central monitoring system 200 can determine that the stairs 203 are currently usable. Accordingly, the central monitoring system 210 can determine an exit path that routes upstairs occupants down the stairs 203 and out a front door 230.

After determining the exit route(s), the central monitoring system 210 can generate and send signaling instructions to various signaling devices located in the house 200, for the signaling devices to emit signal(s) to guide the user to an exit route that will safely lead the user out of the house 200.

Signaling devices can emit multi-colored, strobing, LED (Light Emitting Diode) laser light, and can be mounted low, at exit points (e.g., door, window) in each room. LED guiding lights, can be mounted low in outlet-type components, in pathways leading to egresses from the home. Signaling devices can emit various audio and visual cues to the user, for example. For instance, signaling devices can include flashing lights that may indicate a direction a user is to take to proceed to (or stay one) an exit route. A series of flashing lights (e.g., in a hallway) may indicate a presence and direction of an exit route. Signaling devices can be placed onto doors and windows, to indicate the presence of respective doors and windows, and to indicate whether a given door or window is part of an exit route. Different colors can indicate inclusion or exclusion of a given door, window, or pathway on an exit route. For example, a flashing red signal (e.g., a red "X") on a doorway may indicate that the doorway is to be avoided (and the door kept shut). A flashing green light may indicate that the given door, window, or path segment is part of the exit route.

Signaling devices can be configured to play audio instructions for a user, for providing directional guidance towards egresses. Audio instructions can include a fire status description (e.g., "a fire has been detected downstairs"), directional clues (e.g., "go out of the door and to your left"), or more detailed instructions (e.g., "place a wet towel under the door and leave the door closed"). Audio instructions can be specific to the particular room in which an audio signaling device is located, based on the location of the room, the location of the detected fire, and a determined exit route.

For the particular example of the fire 228 located in the left of the lower level 202, the central monitoring system 210 can emit a lighted directional signal and an audio instruction 232 directing users located in the lower level 202 to proceed to and exit the front door 230. Signaling instructions can be sent from the central monitoring system 210 to the device 218 located near an entry to the lower level 202, for the device 218 to play an audio instruction 234 directing users to not enter the lower level 202.

Signaling instructions can be sent from the central monitoring system 210 to devices located in the room 206, for the devices to direct users located in the room 206 out of the home 200. For example, the devices 224 and 226 can emit lighted arrows that direct the user to a bedroom door 236 and out of the room 206. Signaling devices located on or near the bedroom door 236 (e.g., a signaling device 237) can emit, in response to received instructions, signals (e.g., lighted) indicating the presence of the bedroom door 236 and that the user is to go through the bedroom door 236. Signaling devices located on or near windows 238 and 240 can emit, in response to received instructions, signals (e.g., lighted) indicating that the windows 238 and 240 are not part of a recommended exit route. The device 226 (or another device) can, in response to a received instruction, emit an audio instruction 242 that directs users in the room 206 to exit the room 206 and proceed to the stairs 203. The device 222, located in the hallway 205, can emit a lighted arrow directing users down the hallway 205 and an audio instruction 244 that directs the users to the stairs 203.

Signaling instructions similar to those sent to devices in the room 206 can be sent to devices in the room 208. Signals emitted by devices in the room 208, including an audio instruction 246 played by the device 220, can direct users out of the room 208 (e.g., through a door 246 and down the stairs 203), rather than out a window 248 or a window 250.

Other types of signaling instructions and corresponding signals can be generated in the house 200. For example, information can be sent to mobile devices of occupants of the house 200, that directs the occupants to and on the determined exit routes. The central monitoring system 210, secondary monitoring systems, and/or an application running on a mobile device may know where the mobile device (and associated user) are within the house 200, with respect to the fire and the determined exit routes. Such knowledge can be used to tailor instructions that are sent to and displayed (or played) on a given mobile device.

Other devices in the home may receive and present information related to the fire 228 and recommended evacuation of the house 200. For example, the central monitoring system 210 can communicate with various computing devices or displays located within the house 200. For example, the central monitoring system 210 can send information or signaling instructions to one or more desktop computing devices, smart televisions, or other devices located within the house 200. The computing devices can be configured to display information (e.g., a fire warning, exit route information), based on information received from the central monitoring system 210. In some implementations, the central monitoring system 210 can remotely control (e.g., turn on) devices that include a display, and instruct the devices to display (and/or play) information useful for evacuation of the home 200, such as exit route information that is specific to the location of the fire 228 and the location of the respective device (e.g., a smart television in the lower level 202 may display different information from a smart television in the room 208).

Figure 3:
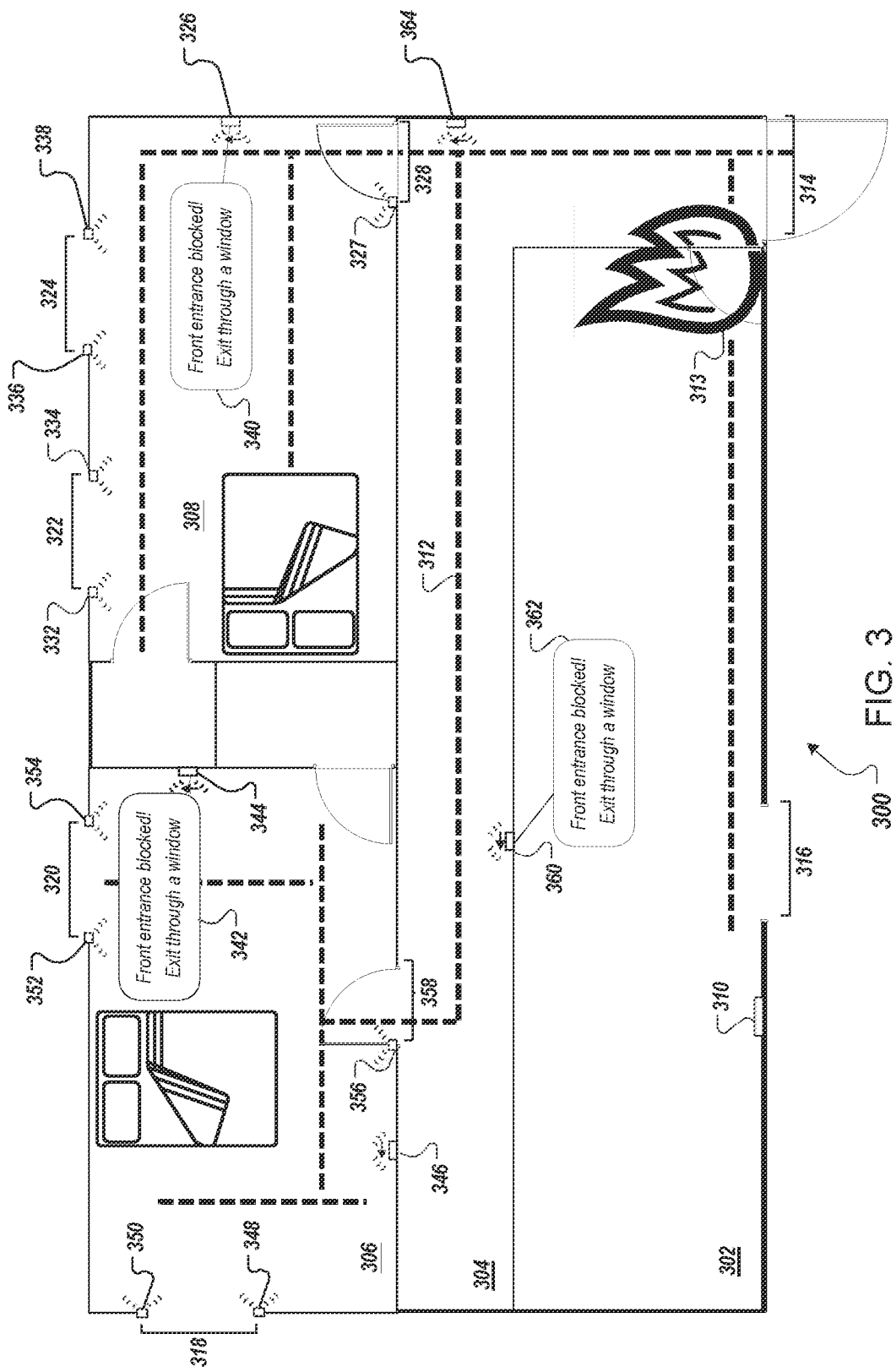
FIG. 3 is a conceptual diagram of another example building for which a floor map is automatically determined and used during an emergency.

FIG. 3 is a drawing of a single-story house 300 that includes a living room 302, a hallway 304, a first bedroom 306, and a second bedroom 308. A central monitoring system 310 has determined a floor map 312 that maps pathways within the house 300. The central monitoring system 310 receives an indication (e.g., from one or more sensors) that there is a fire 313 in the living room 302 that is blocking a front entrance 314. The central monitoring system 310 determines, based on the location of the fire 313 and the determined floor map 312, that the front entrance 314 should not be used in an exit route. The central monitoring system 310 determines that windows 316, 318, 320, and 322 should be included in recommended exit routes, so as to avoid the fire 313.

Signaling instructions can be sent from the central monitoring system 310 to various devices located in the house 300. For example, signaling instructions can be sent to devices in the room 308, for those devices to direct users located in the room 308 out of the home 300. For example, a device 326 can emit a lighted arrow that direct users in the room 308 to the window 324 and the window 322. Signaling devices (e.g., a device 327) located on or near a bedroom door 328 can emit, in response to received instructions, signals (e.g., lighted) indicating that the bedroom door 328 is not part of a recommended exit route. Signaling devices 332 and 334, and 336 and 338, located on or near the window 322 or the window 324, respectively, can emit, in response to received instructions, signals indicating the presence of the window 322 or the window 324 and that the windows are part of a recommended exit route. The device 326 (or another device) can, in response to a received instruction, emit an audio instruction 340 that directs users in the room 308 to exit the room 308 using a window and not the front entrance 314.

Similar signaling instructions sent to devices in the room 308 can be sent to devices in the room 306. The signaling instructions sent to devices in the room 306 can result in an audio instruction 342 being played by a device 344, and emitted (e.g., lighted) signals produced by the device 344, a device 346, and signaling devices 348, 350, 352, 354, and 356 located on or near the window 318, the window 320, or a bedroom door 358, respectively.

A device 360 in the hallway 304 can receive a signaling instruction, and in response, emit a lighted arrow directing users towards the bedroom door 358 (and the windows 318 and 320) and play an audio instruction 362 that directs users to use a window and avoid the front entrance 314. Similarly, a device 364 in the hallway 304 can receive a signaling instruction, and in response, emit a lighted arrow directing users towards the bedroom door 328 (and the windows 322 and 324), and away from the front entrance 314.

Figure 4:
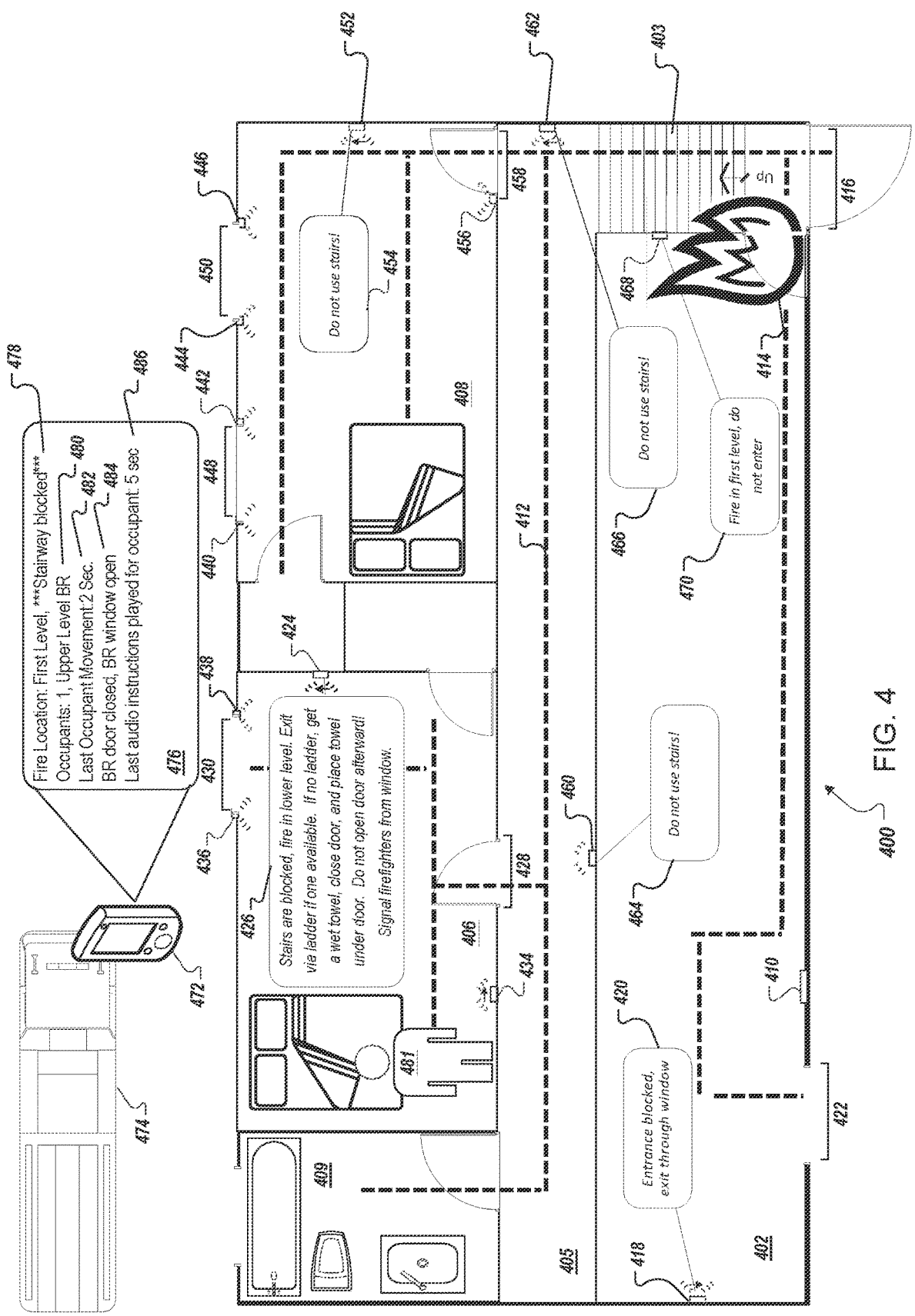
FIG. 4 is a conceptual diagram of yet another example building for which a floor map is automatically determined and used during an emergency.

FIG. 4 is a drawing of a house 400 that includes a lower level 402 and a stairway 403 that goes to an upper level that includes a hallway 405, a first bedroom 406, a second bedroom 408, and a bathroom 409. A central monitoring system 410 has determined a floor map 412, from received motion detection information, that maps pathways within the house 400. The central monitoring system 410 can receive information that indicates a presence of a fire 414 within the lower level 402 that is blocking the stairway 403.

The central monitoring system 410 can determine, based on the floor map 412 and the received fire indication information, one or more exit routes that can be used by users to exit the house 400. For example, the central monitoring system 410 can determine that a front entrance 416 is blocked based on the location of the fire 414, and can direct users on the lower level 402 to exit through a window. For instance, a device 418 can play an audio signal 420 and emit directional indicators directing users to a window 422.

The central monitoring system 410 can determine that the fire 414 is blocking the stairway 403, and can determine that no paths on the floor map 412 lead directly to an exit door without using the blocked stairway 403. The central monitoring system 410 can determine exit guidance instructions to send to devices in the upper level, to guide users on how to exit the home 400 without using the blocked stairway 403. For example, instructions can be sent to a device 424 to play an audio message 426 that directs users to use a ladder, if available, to exit through an upstairs window. If a ladder is not available, the device 424 directs the users to get a wet towel, place it under a door 428, close the door 428 (and not subsequently open it), and signal firefighters from a window (e.g., a window 430).

Based on known locations of the fire 414 and the bathroom 409, the central monitoring system 410 may determine that a user has time and access to retrieve a wet towel before closing the door 428. The central monitoring system 410 may know that the door 428 is currently open (e.g., based on information provided by one or more sensors on the door 428), and may direct users to get the wet towel based on the door 428 being currently open. If the central monitoring system 410 knows that the door 428 is currently closed, the central monitoring system 410 may direct the device 424 to play a message that directs users to keep the door 428 closed.

Other signals can be emitted in the bedroom 406. For example, the device 424 and a device 428 can direct users towards the window 430, by emitting directional lights. Devices 436 and 438 can emit signals to indicate the presence of the window 430.

Guidance similar to that provided in the bedroom 406 can be provided in the bedroom 408. For example, devices 440 and 442 and 444 and 446 can indicate the presence of a window 448 or a window 450, respectively. A device 452 can emit a directional signal directing users to the window 448 and the window 450, and can play an audio recording 454 that directs users to not use the stairway 403. A device 456 can emit a signal indicating that a door 458 is not part of a recommended exit route.

Other signals can be played throughout the house 400. For example, devices 460 and 462 in the hallway 405 can play audio messages 464 and 466, respectively, directing users to not use the stairway 403. A device 468 can play an audio message 470 directing users to not enter the lower level 402. The various signals played by various devices in the house 400 can be emitted in response to signaling instructions sent to the various devices by the central monitoring system 410 (or another monitoring device).

In some implementations, fire fighter or other safety personnel can receive information provided by the central monitoring system 410. The central monitoring system 410 can send information to a fire fighter system or device and/or the central monitoring system 410 can send information to a cloud service to enable the fire fighter system or device to retrieve the information from the cloud service.

Information obtained from the central monitoring system 410 can be displayed, for example, on a fire fighter device 472, which can be a mobile device, as shown (e.g., in a fire truck 474 that is en route to the house 400). The fire truck 474 may be en route, based on receiving an alarm from the central monitoring system 410. Information 476 displayed on the fire fighter device 472 includes fire location and stairway blockage information 478, number and location of occupants 480 (e.g., for an occupant 481), last occupant movement information 482, status 484 of doors and windows in the house 400, and a timeframe 486 of when last audio instructions were played for users in the house 400. In addition or alternatively, the information 476 can include location of fire hydrants. The information 476 can be used by the fire fighters to better respond to the fire situation in the house 400.

The number and location of occupants 480 and the last occupant movement information 482 can be generated based on motion detection devices in the house 400. Fire fighters can tailor their emergency response based on information that indicates who may be in the house 400 and where they are located. Occupant movement information can be generated and sent to a cloud service, on a periodic basis, for example. Security measures can be implemented so that occupant movement information is only accessed by authorized personnel, and optionally, only in cases of an emergency (e.g., only fire fighters may be able to view occupant status information and only after an alarm has been received from the central monitoring system 410). For some cases, the central monitoring system 410 may know that no occupant movement has been detected, e.g., within the last forty eight hours, which may indicate that the house 400 is not occupied. Such information may be shared with fire fighter systems, so that fire fighters know that the house 400 may not be occupied and thus can determine whether fire fighters need to endanger themselves if entering the house 400 (or a certain level of the house 400) may be dangerous.

Fire fighter systems can share information with the central monitoring system 410, and the central monitoring system 410 may tailor guidance based on the received information. For example, an estimated fire fighter response time may be sent by a fire fighter system in response to an alarm received from the central monitoring system 410. The central monitoring system 410 may select certain instructions based on the response time. For example, if the expected response time is less than a threshold amount (e.g., less than two minutes), the central monitoring system 410 may direct devices in the upper level to play an audio message directing users in the upper level to open a window and wave a towel or sheet to attract fire fighter attention. In other examples, the central monitoring system 410 can operate to devices to start playing a sound or audio message to draw attention of fire fighters based on an estimated fire fighter response time. Estimated response times may be dynamically received, as mentioned, or may be predetermined and available to the central monitoring system 410 before the emergency.

Occupant movement information and information about known occupants may be used by the central monitoring system 410 to tailor guidance to users in the house 400. For example, an emergency plan, which may have been partially generated by the central monitoring system 410 and manually edited by user(s) in the house 400, may indicate that a child under the age of six generally sleeps in a particular bedroom. The central monitoring system 410 may, based on this information and based on movement detection in that bedroom during an emergency, generate an audio message to be played in other rooms that indicates that the child may still be in the particular bedroom and may need assistance. Similar guidance may be performed if elderly or disabled users are in the house 400.

In some implementations, after fire fighter arrival, movement of fire fighters within the house 400 can be determined by movement detection devices within the house 400. Location information of fire fighters (and occupants) can be made available to and presented on the fire fighter device 472, for assisting the fire fighter team during the emergency response.

Figure 5:
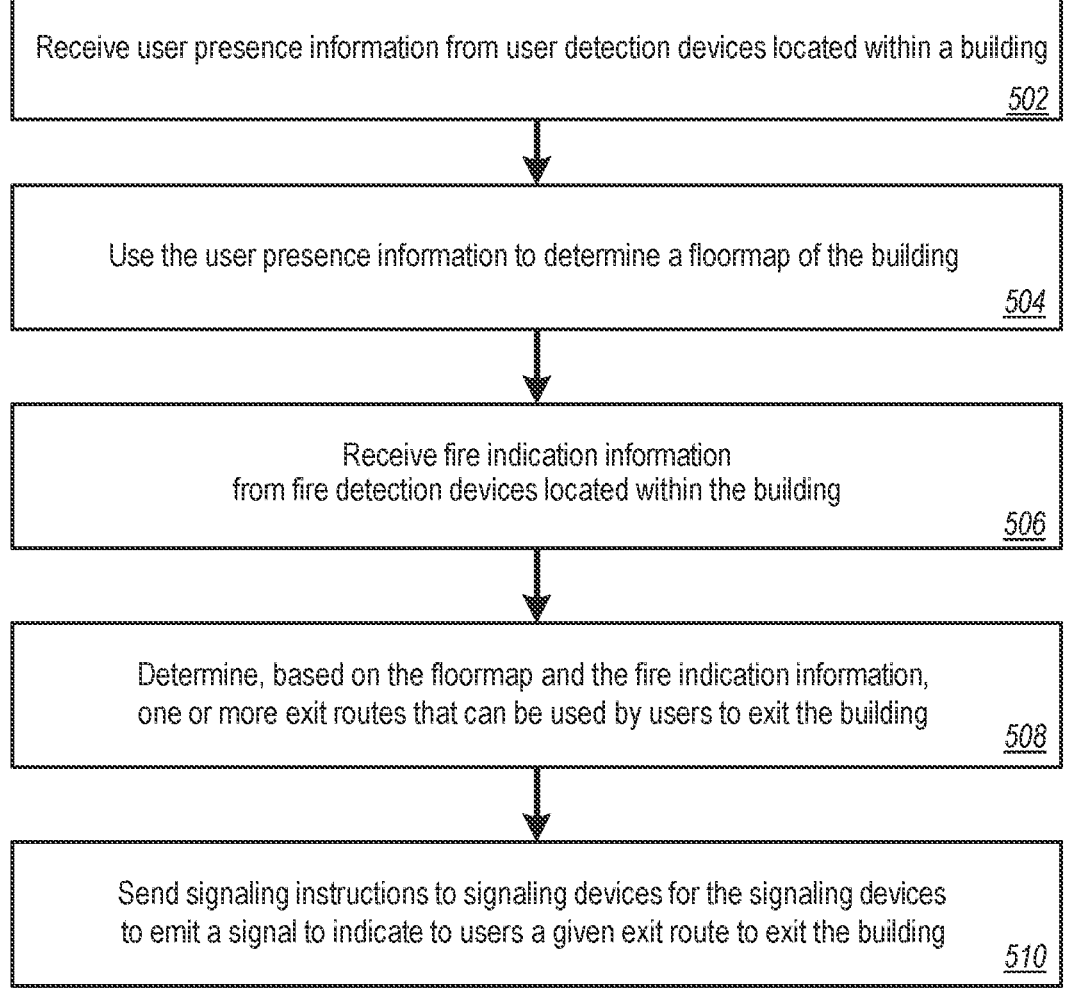
FIG. 5 depicts a flowchart of an example technique for automatically determining a floor map of a building and using the floor map for advising how to exit the building during an emergency.

FIG. 5 depicts a flowchart of an example technique 500 for automatically determining a floor map of a building and using the floor map for advising how to exit the building during an emergency. The technique 300 can be performed by the central monitoring system 101 of FIG. 1.

The central monitoring system can receive user presence information from user detection devices (502). The user detection devices can detect the presence of users within the building, such as by using motion detection.

The central monitoring system can use the user presence information to determine a floormap of the building (504). The floormap can indicate routes within the building, including exits out of the building.

The central monitoring system can receive fire indication information from the fire detection devices located within the building (506). The fire indication information can indicate one or more locations within the building that may have a fire.

The central monitoring system can determine, based on the floormap and the fire indication information, one or more exit routes that can be used by users to exit the building (508). The exit routes are can be selected to avoid the locations within the building that may have a fire.

The central monitoring system can send signaling instructions to signaling devices for the signaling devices to emit a signal to indicate to the user an exit route to exit the building (510).

Figure 6:
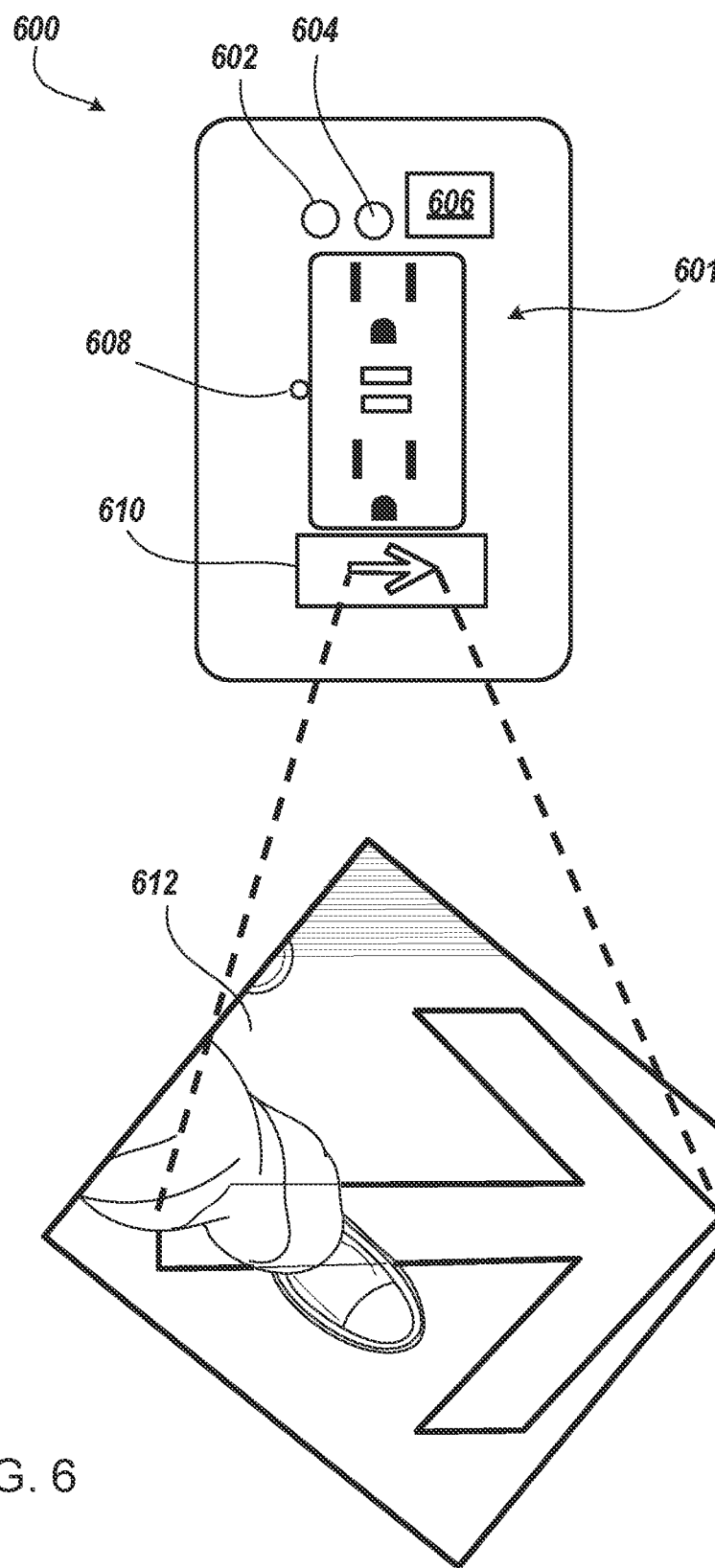
FIG. 6 is an example apparatus for providing emergency guidance and advisement.

FIG. 6 is an example apparatus 600 for providing emergency guidance and advisement in accordance with this present disclosure. In this example, the apparatus 600 is configured as an electrical power outlet that includes one or more receptacles 601. The apparatus 600 is configured to include the user detection device 103, the fire detection device 110, and the signaling device 120. In other examples, the apparatus 600 can be configured to implement one or more of the user detection device 103, the fire detection device 110, and the signaling device 120, with or without other functionalities. The apparatus 600 can be used to implement at least one of the devices 210, 214, 216, 218, 220, 222, 224, 226, 237, and 246 (FIG. 2), the devices 310, 326, 327, 332, 334, 336, 338, 344, 346, 348, 350, 352, 354, 356, 360, and 364 (FIG. 3), the devices 410, 418, 424, 434, 436, 438, 440, 443, 444, 446, 452, 456, 460, 462, and 468 (FIG. 4), and other similar devices.

The apparatus 600 includes a user detector 602, a fire detector 604, a communication device 606, a speaker 608, and a display device 610. The user detector 602 can be configured for, or be part of, the user detection device 103 as discussed herein. For example, the user detector 602 operates to detect user motion or presence around the apparatus 600 over time. The user motion or presence can be recorded locally in the apparatus 600 and/or in one or more remote computing devices. As described herein, the user detector 602 can be of various types, such as motion sensors and cameras. In addition or alternatively, the user detector 602 can include a door/window sensor, door/window locks, etc.

The fire detector 604 can be configured for, or be part of, the fire detection device 110, and operates to detect presence and location of fire. Information on the fire presence and location can be recorded locally in the apparatus 600 and/or in one or more remote computing devices. As described herein, the fire detector 604 can be of various types, such as a smoke detector and a heat sensor (e.g., a temperature sensor, an infrared sensor, etc.).

The communication device 606 is included in the apparatus 600 and configured to enable data communication with the central monitoring system 101 and/or other computing devices via the network(s) 102. The communication device 606 can include a wireless or wired data communication interface.

The speaker 608 and the display device 610 can be configured for, or be part of, the signaling device 120. The speaker 608 operates to generate sounds, such as audible cues, horns, or verbal messages for egress guidance. The speaker 608 can be used to supplement other fixed audio devices or act as a substitute if fixed audio devices are not functioning. Such sounds can complement visual signs in situations where smoke intensity can diminish or preclude the ability to see the visual signs.

The display device 610 operates to display visual signs that can guide a user along an exit route 116. In some examples, the display device 610 includes a display screen that is provided in the apparatus 600 and displays information with visual signs thereon. In addition or alternatively, the display device 610 operates as a projector that projects a lighted sign on another object, such as a wall, a floor, or a ceiling. In the illustrated example, the display device 610 projects a lighted arrow on the floor to guide the direction in an exist route 116.

Figure 7:
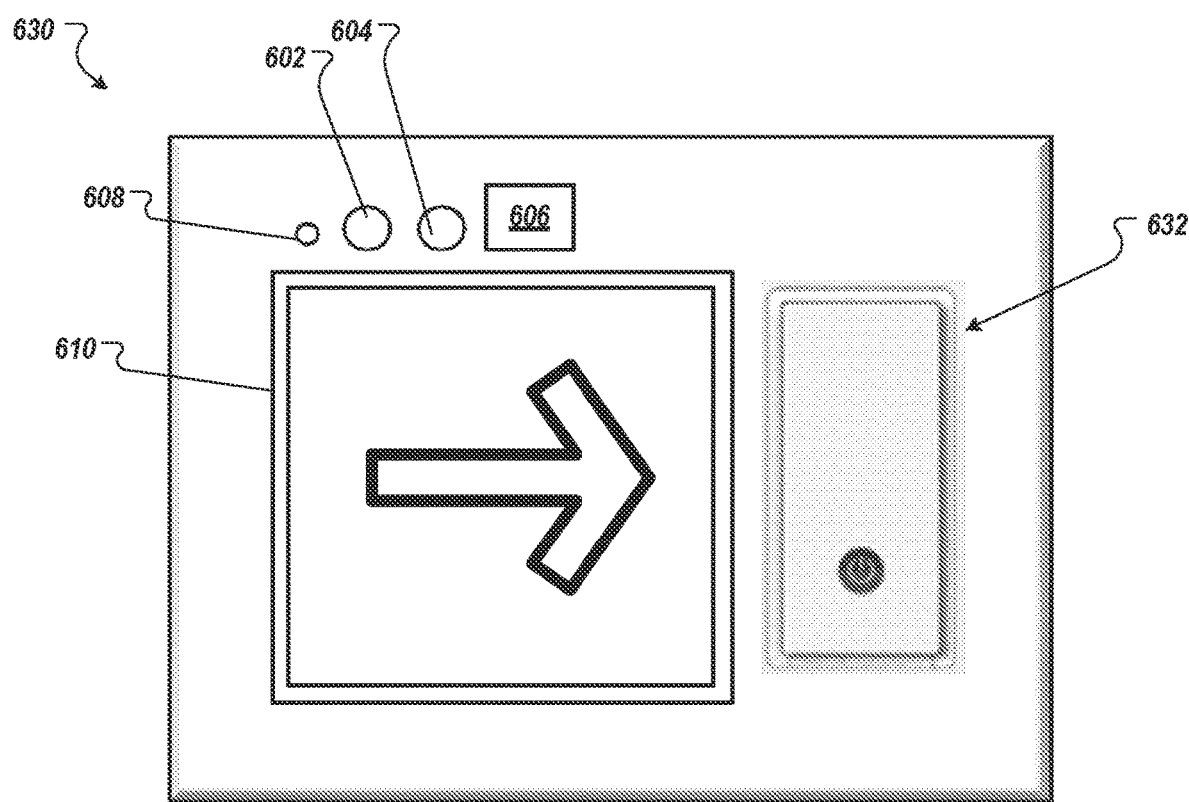
FIG. 7 is another example apparatus for providing emergency guidance and advisement.

FIG. 7 is another example apparatus 630 for providing emergency guidance and advisement in accordance with this present disclosure. The apparatus 630 is configured similar to the apparatus 600 except that the apparatus 630 is implemented as an electrical switch having a switch button 632. Similarly to the apparatus 600, the apparatus 630 can include at least one of the user detector 602, the fire detector 604, the communication device 606, the speaker 608, and the display device 610. As the apparatus 630 is similar to the apparatus 600, the description of the apparatus 600 is incorporated by reference with respect to the apparatus 630.

Figure 8:
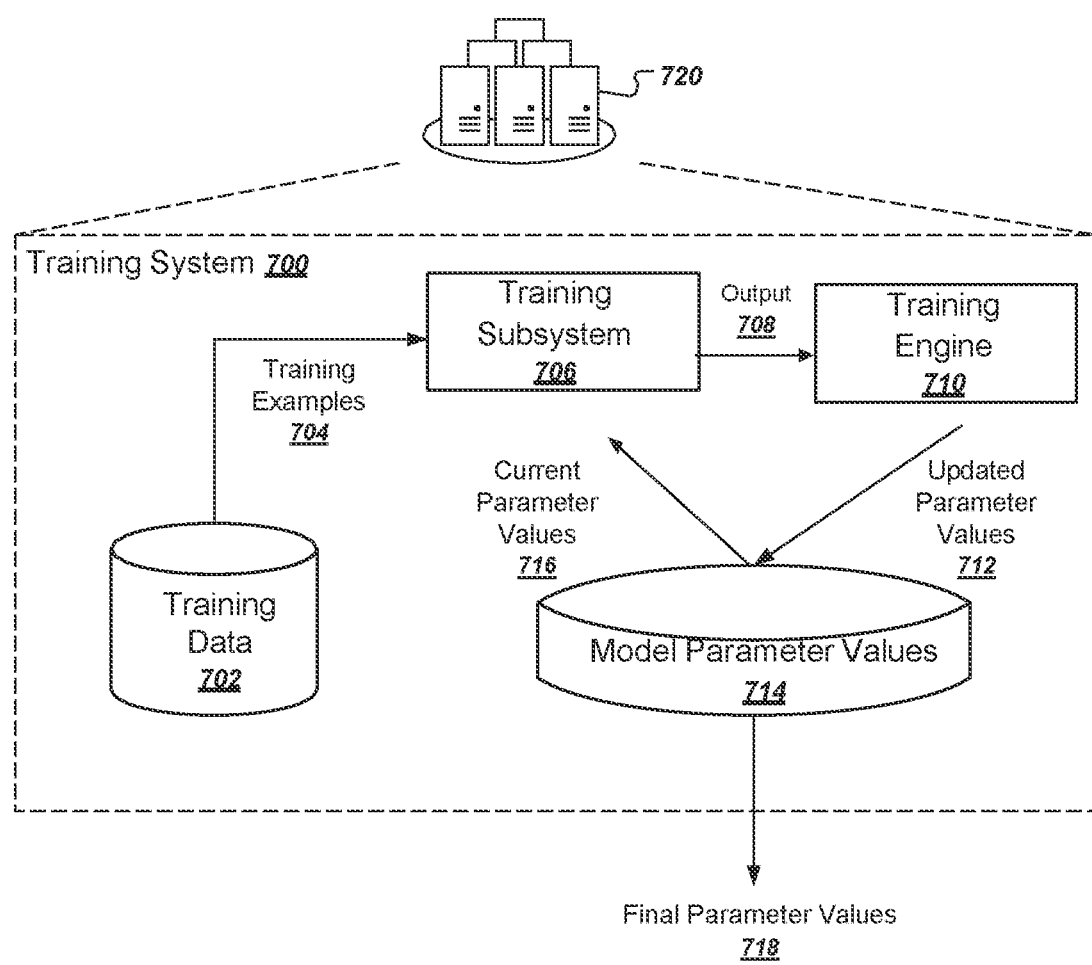
FIG. 8 depicts an example system for training a system improvement engine.

FIG. 8 depicts an example system 700 for training the improvement engine 130. The training system 700 can be hosted within a data center 720 which can be a distributed computing system having hundreds or thousands of computers in one or more locations.

The training system 700 includes a training subsystem 706 that can implement the operations of a machine learning model that is designed to generate a floormap 108 from the user presence information 104, and/or generate one or more exit routes 116 from the floormap 108 and the fire indication information 112. The training subsystem 706 includes a plurality of computing devices having software or hardware modules that build one or more statistical models. Where the training subsystem 706 uses a neural network, the training subsystem 706 operates to implement operations of each layer of the neural network according to an architecture of the neural network. Generally, the training subsystem 706 has the same architecture as the improvement engine 130. However, the training system 700 need not use the same hardware to compute the operations of the statistical models. In other words, the training system 700 can use CPUs only, highly parallelized hardware, or some combination of these.

The training subsystem 706 can compute the operations of the statistical models using current parameter values 716 stored in a collection of model parameter values 714. Although illustrated as being logically separated, the model parameter values 714 and the software or hardware modules performing the operations may actually be located on the same computing device or on the same memory device.

The training subsystem 706 can generate, for each training example 704, an output 708 (e.g., a floormap 108 or an exit route 116). A training engine 710 analyzes the output 708 and compares the output 708 to labels in the training examples 704 that indicate target outputs for each training example 704. The training engine 710 then generates updated model parameter values 714 by using an appropriate updating technique, e.g., stochastic gradient descent with backpropagation. The training engine 710 can then update the collection of model parameter values 714 using the updated model parameter values 712.

After training is complete, the training system 700 can provide a final set of parameter values 718 to the central monitoring system 100 for use in generating a floormap 108 or an exit route 116. The training system 700 can provide the final set of model parameter values 718 by a wired or wireless connection to the central monitoring system 101, for example.

The computing devices described in this document that may be used to implement the systems, techniques, machines, and/or apparatuses can operate as clients and/or servers, and can include one or more of a variety of appropriate computing devices, such as laptops, desktops, workstations, servers, blade servers, mainframes, mobile computing devices (e.g., PDAs, cellular telephones, smartphones, and/or other similar computing devices), computer storage devices (e.g., Universal Serial Bus (USB) flash drives, RFID storage devices, solid state hard drives, hard-disc storage devices), and/or other similar computing devices. For example, USB flash drives may store operating systems and other applications, and can include input/output components, such as wireless transmitters and/or USB connectors that may be inserted into a USB port of another computing device.

Such computing devices may include one or more of the following components: processors, memory (e.g., random access memory (RAM) and/or other forms of volatile memory), storage devices (e.g., solid-state hard drive, hard disc drive, and/or other forms of non-volatile memory), high-speed interfaces connecting various components to each other (e.g., connecting one or more processors to memory and/or to high-speed expansion ports), and/or low speed interfaces connecting various components to each other (e.g., connecting one or more processors to a low speed bus and/or storage devices). Such components can be interconnected using various busses, and may be mounted across one or more motherboards that are communicatively connected to each other, or in other appropriate manners. In some implementations, computing devices can include pluralities of the components listed above, including a plurality of processors, a plurality of memories, a plurality of types of memories, a plurality of storage devices, and/or a plurality of buses. A plurality of computing devices can be connected to each other and can coordinate at least a portion of their computing resources to perform one or more operations, such as providing a multi-processor computer system, a computer server system, and/or a cloud-based computer system.

Processors can process instructions for execution within computing devices, including instructions stored in memory and/or on storage devices. Such processing of instructions can cause various operations to be performed, including causing visual, audible, and/or haptic information to be output by one or more input/output devices, such as a display that is configured to output graphical information, such as a graphical user interface (GUI). Processors can be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory can store information within computing devices, including instructions to be executed by one or more processors. Memory can include a volatile memory unit or units, such as synchronous RAM (e.g., double data rate synchronous dynamic random access memory (DDR SDRAM), DDR2 SDRAM, DDR3 SDRAM, DDR4 SDRAM), asynchronous RAM (e.g., fast page mode dynamic RAM (FPM DRAM), extended data out DRAM (EDO DRAM)), graphics RAM (e.g., graphics DDR4 (GDDR4), GDDR5). In some implementations, memory can include a non-volatile memory unit or units (e.g., flash memory). Memory can also be another form of computer-readable medium, such as magnetic and/or optical disks.

Storage devices can be capable of providing mass storage for computing devices and can include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products can be tangibly embodied in an information carrier, such as memory, storage devices, cache memory within a processor, and/or other appropriate computer-readable medium. Computer program products may also contain instructions that, when executed by one or more computing devices, perform one or more methods or techniques, such as those described above.

High speed controllers can manage bandwidth-intensive operations for computing devices, while the low speed controllers can manage lower bandwidth-intensive operations. Such allocation of functions is exemplary only. In some implementations, a high-speed controller is coupled to memory, display 616 (e.g., through a graphics processor or accelerator), and to high-speed expansion ports, which may accept various expansion cards; and a low-speed controller is coupled to one or more storage devices and low-speed expansion ports, which may include various communication ports (e.g., USB, Bluetooth, Ethernet, wireless Ethernet) that may be coupled to one or more input/output devices, such as keyboards, pointing devices (e.g., mouse, touchpad, track ball), printers, scanners, copiers, digital cameras, microphones, displays, haptic devices, and/or networking devices such as switches and/or routers (e.g., through a network adapter).

Displays may include any of a variety of appropriate display devices, such as TFT (Thin-Film-Transistor Liquid Crystal Display) displays, OLED (Organic Light Emitting Diode) displays, touchscreen devices, presence sensing display devices, and/or other appropriate display technology. Displays can be coupled to appropriate circuitry for driving the displays to output graphical and other information to a user.

Expansion memory may also be provided and connected to computing devices through one or more expansion interfaces, which may include, for example, a SIMM (Single In Line Memory Module) card interfaces. Such expansion memory may provide extra storage space for computing devices and/or may store applications or other information that is accessible by computing devices. For example, expansion memory may include instructions to carry out and/or supplement the techniques described above, and/or may include secure information (e.g., expansion memory may include a security module and may be programmed with instructions that permit secure use on a computing device).

Computing devices may communicate wirelessly through one or more communication interfaces, which may include digital signal processing circuitry when appropriate. Communication interfaces may provide for communications under various modes or protocols, such as GSM voice calls, messaging protocols (e.g., SMS, EMS, or MMS messaging), CDMA, TDMA, PDC, WCDMA, CDMA2000, GPRS, 4G protocols (e.g., 4G LTE), and/or other appropriate protocols. Such communication may occur, for example, through one or more radio-frequency transceivers. In addition, short-range communication may occur, such as using a Bluetooth, Wi-Fi, or other such transceivers. In addition, a GPS (Global Positioning System) receiver module may provide additional navigation and location-related wireless data to computing devices, which may be used as appropriate by applications running on computing devices.

Computing devices may also communicate audibly using one or more audio codecs, which may receive spoken information from a user and convert it to usable digital information. Such audio codecs may additionally generate audible sound for a user, such as through one or more speakers that are part of or connected to a computing device. Such sound may include sound from voice telephone calls, may include recorded sound (e.g., voice messages, music files, etc.), and may also include sound generated by applications operating on computing devices.

Various implementations of the systems, devices, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., LCD display screen, LED display screen) for displaying information to users, a keyboard, and a pointing device (e.g., a mouse, a trackball, touchscreen) by which the user can provide input to the computer. Other kinds of devices can be used to provide for interaction with a user as well; for example, feedback provided to the user can be any form of sensory feedback (e.g., visual feedback, auditory feedback, and/or tactile feedback); and input from the user can be received in any form, including acoustic, speech, and/or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Additionally, the steps and techniques described above as being performed by some computing devices and/or systems may alternatively, or additionally, be performed by other computing devices and/or systems that are described above or other computing devices and/or systems that are not explicitly described. Similarly, the systems, devices, and apparatuses may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

What is claimed is:

1. A system for emergency egress advisement for a building, the system comprising:
    a plurality of sensors positioned at different locations throughout the building;
    a plurality of egress advisement devices positioned at different locations throughout the building and configured to output egress instructions to users in the building for exiting the building during an emergency; and
    at least one first computing device that determines a floormap of the building and generates the egress instructions for the building, wherein the floormap indicates multiple routes within the building and multiple exits out of the building, wherein the egress instructions are customized for (i) the multiple routes within the building and (ii) locations of the plurality of egress advisement devices, the at least one first computing device configured to, during an emergency:
        receive, from at least one of (i) one or more of the plurality of egress advisement devices and (ii) one or more of the plurality of sensors positioned throughout the building, an indication of the emergency and user presence information in the building;
        retrieve, from a local data store, the generated egress instructions for the building;
        select, for each of the plurality of egress advisement devices and based on (i) the indication of the emergency, (ii) the user presence information, and (iii) the location of each of the plurality of egress advisement devices, one of the retrieved egress instructions that is customized for each of the plurality of egress advisement devices; and
        transmit, to each of the plurality of egress advisement devices, the selected one of the egress instructions to be outputted to guide the users to exit the building,
    wherein each of the plurality of egress advisement devices is further configured to:
        determine that communications are terminated between at least one of the plurality of egress advisement devices and the at least one first computing device;
        obtain the indication of the emergency and the user presence information; and
        retrieve, from the local data store and based on the indication of the emergency and the user presence information, a second of the egress instructions that is associated with the location of the at least one of the plurality of egress advisement devices determined to have terminated communications, wherein the second of the egress instructions is different than the at least one first computing device-selected one of the egress instructions.

2. The system of claim 1, wherein each of the plurality of egress advisement devices is assigned a location identifier that corresponds to a location identifier for each of the generated egress instructions, and wherein the at least one first computing device is further configured to associate the location identifier of each of the plurality of egress advisement devices with the location identifier for each of the generated egress instructions.

3. The system of claim 1, wherein the plurality of sensors is included in the plurality of egress advisement devices.

4. The system of claim 1, wherein each of the plurality of egress advisement devices is configured to:
detect real-time conditions that occur in proximity to the location of each of the plurality of egress advisement devices; and
transmit, to the at least one first computing device, the detected real-time conditions.

5. The system of claim 4, wherein the at least one first computing device is further configured to, in response to receiving the real-time conditions, change one or more selections of the egress instructions for one or more of the plurality of egress advisement devices.

6. The system of claim 4, wherein the real-time conditions include at least one of a change in (i) the user presence information, (ii) building information, and (iii) emergency information.

7. The system of claim 6, wherein the change in user presence information includes at least one of a current location, age, agility, disability, and visitor status of one or more of the users in the building.

8. The system of claim 6, wherein the change in emergency information includes at least one of a current location of the emergency, an amount of time for the emergency to spread to one or more other locations in the building, and a temperature of the emergency.

9. The system of claim 1, wherein the at least one first computing device is configured to select the egress instructions for each of the plurality of egress advisement devices before receiving the indication of the emergency in the building and, in response to receiving the indication of the emergency in the building, instruct each of the plurality of egress advisement devices to output the selected egress instructions.

10. The system of claim 1, wherein the plurality of egress advisement devices forms a peer-to-peer network.

11. The system of claim 1, wherein a first of the plurality of egress advisement devices is configured to
determine that communications is terminated between at least one of the plurality of egress advisement devices and the at least one first computing device;
obtain the indication of the emergency and the user presence information;
select, based on the indication of the emergency and the user presence information, egress instructions for each of the first and the others of the plurality of egress advisement devices, wherein each of the selected egress instructions is customized for the location of a corresponding one of the first and the others of the plurality of egress advisement devices; and
transmit, to the corresponding one of the first and the others of the plurality of egress advisement devices, the selected egress instructions that is customized for the location of the corresponding one of the first and the others of the plurality of egress advisement devices.

12. The system of claim 11, wherein the first of the plurality of egress advisement devices is further configured to select egress instructions for each of the plurality of egress advisement devices based at least in part on last-received information from the at least one first computing device.

13. The system of claim 11, wherein the first of the plurality of egress advisement devices is configured to select egress instructions for each of a first subset of the plurality of egress advisement devices and a second of the plurality of egress advisement devices is configured to select egress instructions for each of a second subset of the plurality of egress advisement devices, the second subset being different from the first subset.

14. The system of claim 13, wherein:
at a first time, the first of the plurality of egress advisement devices is configured to select egress instructions for each of the first and the others of the plurality of egress advisement devices; and
at a second time, the second of the plurality of egress advisement devices is configured to:
monitor real-time conditions in the building based on each of the second and the others of the plurality of egress advisement devices outputting the selected egress instructions to the users in the building;
update selection, based on the real-time conditions, of one or more of the selected egress instructions for one or more of the plurality of egress advisement devices; and
transmit, to the one or more of the plurality of egress advisement devices, the updated selected egress instructions to be outputted to guide the users to exit the building.

15. The system of claim 14, wherein, at a third time, a third of the plurality of egress advisement devices is configured to monitor the real-time conditions in the building based on the one or more of the plurality of egress advisement devices outputting the updated selected egress instructions to guide the users to exit the building.

16. The system of claim 1, wherein the at least one first computing device is one of the plurality of egress advisement devices.

17. The system of claim 1, wherein the at least one first computing device is positioned in a central location in the building.

18. The system of claim 1, wherein the at least one first computing device is further configured to, based on the indication of the emergency in the building:
selectively and remotely turn on, based on the user presence information, one or more devices positioned throughout the building that are proximate to locations of the users in the building, wherein the one or more devices have at least one of (i) graphical user interface (GUI) displays, (ii) audio output devices, and (iii) visual projectors; and
instruct the one or more devices to output, at the at least one of (i)-(iii), at least one of the floormap and the generated egress instructions, wherein the floormap and the generated egress instructions are customized for each of the plurality of egress advisement devices positioned throughout the building, wherein a first of the one or more devices is instructed to output first egress instructions at a first of the at least one of (i)-(iii)

and a second of the one or more devices is instructed to output second egress instructions at a second of the at least one of (i)-(iii), wherein the first egress instructions are different than the second egress instructions.

19. A computer-implemented method for emergency egress advisement for a building, the method comprising:
    receiving, by at least one first computing device and from at least one of (i) one or more of a plurality of egress advisement devices and (ii) one or more of a plurality of sensors positioned throughout the building, an indication of an emergency and user presence information in the building;
    retrieving, by the at least one first computing device and from a local data store, generated egress instructions for the building, wherein the generated egress instructions are customized for (i) multiple routes within the building and (ii) locations of the plurality of egress advisement devices;
    selecting, by the at least one first computing device for each of the plurality of egress advisement devices and based on (i) the indication of the emergency, (ii) the user presence information, and (iii) the location of each of the plurality of egress advisement devices, one of the retrieved egress instructions that is customized for each of the plurality of egress advisement devices;
    transmitting, by the at least one first computing device to each of the plurality of egress advisement devices, the selected one of the egress instructions to be outputted to guide the users to exit the building;
    obtaining, by each of the plurality of egress advisement devices, the indication of the emergency and the user presence information;
    determining, by each of the plurality of egress advisement devices, that communications are terminated between at least one of the plurality of egress advisement devices and the at least one first computing device; and
    retrieving, by each of the plurality of egress advisement devices, from the local data store, and based on the indication of the emergency and the user presence information, a second of the egress instructions that is associated with the location of the at least one of the plurality of egress advisement devices determined to have terminated communications,
    wherein the second of the egress instructions is different than the at least one first computing device-selected one of the egress instructions.

20. The method of claim 19, further comprising:
    receiving, by the at least one first computing device and from at least one of (i) the one or more of the plurality of egress advisement devices and (ii) the one or more of the plurality of sensors, real-time conditions that occur in proximity to the location of each of the plurality of egress advisement devices; and
    changing, by the at least one first computing device and in response to receiving the real-time conditions, one or more selections of the egress instructions for one or more of the plurality of egress advisement devices.

* * * * *